(12) United States Patent
Lacaze (10) Patent No.: US 8,045,354 B2
(45) Date of Patent: Oct. 25, 2011

(54) ACTIVE GENERATOR CONTROL SEQUENCE

(75) Inventor: Alain Lacaze, Essert (FR)

(73) Assignee: Alstom Technology Ltd, Baden (CH)

( * ) Notice: Subject to any disclaimer, the term of this patent is extended or adjusted under 35 U.S.C. 154(b) by 727 days.

(21) Appl. No.: 12/079,817

(22) Filed: Mar. 28, 2008

(65) Prior Publication Data

US 2008/0247211 A1    Oct. 9, 2008

(30) Foreign Application Priority Data

Mar. 30, 2007    (EP) .................................... 07105373

(51) Int. Cl.
*H02M 5/257*    (2006.01)
(52) U.S. Cl. ........................................ 363/160; 363/163
(58) Field of Classification Search ................. 363/56.1, 363/58, 65, 148, 159–163, 44
See application file for complete search history.

(56) References Cited

U.S. PATENT DOCUMENTS

| | | | | |
|---|---|---|---|---|
| 5,287,025 | A * | 2/1994 | Nishimichi | 327/156 |
| 5,402,053 | A * | 3/1995 | Divan et al. | 318/768 |
| 5,594,636 | A | 1/1997 | Schauder | |
| 5,909,367 | A * | 6/1999 | Change | 363/163 |
| 6,484,268 | B2 * | 11/2002 | Tamura et al. | 713/600 |
| 6,519,170 | B2 | 2/2003 | Lacaze et al. | |
| 6,566,764 | B2 * | 5/2003 | Rebsdorf et al. | 290/44 |
| 7,450,532 | B2 * | 11/2008 | Chae et al. | 370/310 |

FOREIGN PATENT DOCUMENTS

| | | |
|---|---|---|
| DE | 10051222 | 4/2002 |
| EP | 1199794 | 4/2002 |

OTHER PUBLICATIONS

Mohan, Ned et al. "Power Electronics: Converters, Applications, and Design", 2nd Edition, John Wiley & Sons, Inc., New York, p. 11-12, 1995.

* cited by examiner

*Primary Examiner* — Rajnikant B Patel
(74) *Attorney, Agent, or Firm* — Leydig, Voit & Mayer, Ltd.

(57) ABSTRACT

A method for operating a matrix converter to convert n phases of a generator into alternating voltage with $n_r$ ($n_r$<n) phases of a load connected to a network includes the steps of alternatingly connecting the nr phases of the load using a plurality of controllable bi-directional switches disposed in an (n×$n_r$) matrix, wherein nr phases of the generator are always connected with the load and (n–$n_r$) phases of the generator are not connected with the load, and controlling the switching of a phase k of the generator at a time t to a phase c of the grid, using a periodical, continuous, segmented function k(t). The function k(t) defines a broken line having a plurality of segments, wherein each segment i is defined by a starting time $t_i$ and a pulsation $\omega_i$, and the value of the function k(t) is rounded to the closest integer value.

13 Claims, 4 Drawing Sheets
(1 of 4 Drawing Sheet(s) Filed in Color)

ACTIVE GENERATOR CONTROL SEQUENCE

Priority is claimed to European Patent Application No. EP 07105373.0, filed on Mar. 30, 2007, the entire disclosure of which is incorporated by reference herein.

The present invention relates to the field of power electronics and in particular to power generation with a synchronous generator which is operated above the synchronous mains frequency. The invention more specifically relates to a method for operating a matrix converter which when being operated to convert m phases of a generator into alternating voltage with n (n<m) phases of a load connected to a network alternatingly connects the n phases of the load via a multiple number of controllable bi-directional switches arranged in an (m×n) matrix, whereby n phases of the generator are always connected with the load while (m−n) phases of the generator are not connected with the load. It further relates to a use of such a method as well as to a matrix converter for implementing the method.

BACKGROUND

In power generation, at a specified output, an increase of the rotary speed of a turbine is associated with a decrease in size and costs. Efficiency, too, can be improved. Already, power generation turbines up to 70 MW are connected to generators by way of gearing arrangements, so as to allow operation at higher rotary speeds. As the output increases, the use of gearing arrangements becomes increasingly difficult for safety reasons. In such cases, the turbine is operated at synchronous speed.

The use of a gearing arrangement is associated with the following disadvantages:
- a fixed transmission ratio;
- a noise level above 100 db for 40 MW, and above 115 db for 70 MW;
- mechanical losses irrespective of the particular load; and
- exacting requirements with regard to cooling and lubrication with oil.

The use of static frequency converters in the form of rectifier/inverter or the use of cycloconverters (power electronics) represents an alternative. The following advantages could be expected:
- reduced costs of the generator in agreement with a constant product of volume and rotational speed;
- a standardized generator for both 50 and 60 Hz;
- an adjustable speed which allows restoration of the partial-load efficiency of the turbine;
- reduced losses in relation to the gearing arrangement, at least in partial load;
- a substantial reduction in noise;
- clean (oil-free) cooling;
- no upper limit of the possible output, resulting in a significant reduction in the cost of the turbine by keeping it small—an option not provided by a gearing arrangement; and
- use of the generator as a starter motor (in the case of gas turbine applications).

Both in the case of power generation and in the case of drives, a reduction in losses of the static frequency converters or cycloconverters would bring about substantial cost savings. A reduction of the losses would above all have a bearing on investment costs because cooling accounts for a substantial part of the total costs of the converter.

Furthermore, reduced cooling requirements provide the option of keeping the electronics more compact, thus facilitating integration of the power electronics in the electric power station or even in the generator unit. Close integration of the power electronics in the generator unit would provide the additional advantage of short connection lines, shared coolant devices and a smaller overall volume (savings in building costs).

In the field of large drives of up to several 10 MW, these advantages also arise from the reduced losses, thus providing a competitive advantage compared to direct mechanical drives of a turbine.

The indirect conversion which is used in rectifier/inverters (AC/DC/AC) is caused by generating a directed direct current or a directed direct voltage from the three-phase source (mains in the case of motors; generator in the case of power generation). Subsequently, the direct current or the direct voltage is converted back to an alternating current by means of an inverter.

An inductance (current converter) or a capacitor bank (voltage converter) are switched into the intermediate circuit so as to reduce the ripple component of the current or the spikes.

These days, rectifier/inverters make use of thyristors. If natural commutation of the thyristors is possible, the losses in the converter are reduced. However, induction motors for example, take up reactive power. In order to make this reactive power from the net available, it should be possible to switch off the current in a specified arm of the converter at any desired time. In this case there is forced commutation and thus there are increased losses. In the electrical machine (generator or motor), the phase currents are chopped direct currents. The armature reaction does not rotate at constant speed and amplitude but instead jumps around according to the commutation cycle. A 6-pulse or 12-pulse converter provides six or twelve different angular positions for the armature reaction. This results in strongly pulsating torques and large additional losses in the electrical machine which can lead to deterioration of the machine. In 12-pulse converters the effect is 4 times smaller than in 6-pulse converters.

Voltage converters use GTOs with their inherent high switching losses, as well as IGBTs or IGCTs. The power of the individual components is less than that of thyristors, consequently, a larger number of components are required for a specified voltage or a specified current. Voltage converters can benefit from the use of pulse-width modulation techniques which improve the shape of the current curves and reduce the harmonics. The higher the switching frequencies the better, except with regard to losses and dielectric fatigue. The curve shape of the current can largely be sine-shaped so that a decrease of power of the electrical machine is avoided.

Direct conversion (AC/AC) is for example possible by means of a so-called cyclo-converter. Direct conversion provides significant advantages from the point of view of the electrical machine, because the current is more or less a sine-shaped wave rather than chopped direct current. It reduces the losses which occur additionally within the electrical machine and it also prevents pulsating torques.

However, the use of cyclo-converters limits the achievable frequency range to 0-⅓ of the input frequency. Due to imbalanced operation, exceeding the ⅓ limit results in overdimensioning up to a factor of 3.

Another possibility of direct conversion is provided by a so-called matrix converter in which each phase of a multi-phase source (generator or mains) is connected or connectable with each phase of a multi-phase load (mains, passive load, motors, etc.) by a bi-directional switch (see e.g. N. Mohan et al., Power Electronics, 2nd Edition, John Wiley & Sons, New York pp 11-12). The switches consist of an adequate number of thyristors to withstand the differential voltage between the phases, and the phase currents, and to allow current reversal. They can be regarded as truly bi-directional components with the options of jointly using additional wiring such as snubbers or the power supplies for the drive pulses for the antiparallel components.

The switches are arranged in an (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses which arise from forced commutation still remain. Furthermore, the possible forced commutation necessitates the use, in all positions on the matrix, of components which can be switched off. This considerably increases the switching expenditure.

However, it is possible to operate a matrix converter in a way that only natural commutations are being used. This can be achieved by only allowing the switching over from a selected connected phase of the generator to a selected not connected phase of the generator only if certain conditions are met. Such a matrix converter as well as a mode of its operation has been disclosed in DE-A-100 51 222 as well as in the corresponding European patent EP-B-1 199 794.

However, this mode of operation allowing a cheap and reliable control of the matrix converter can only be used to control frequency but not to control the voltage. Voltage is therefore controlled by means of the excitation system, as usual in large power generation.

In the so-called "clock" sequence, intended to be used to generate the firing pulses for the active generator matrix converter commutations are requested with constant time steps and the generator phase number increases by one unit at each commutation.

Some commutations are periodically delayed because of a misfit between current and voltage conditions. The strength of this method results from the low commutation frequency which is undoubtedly the very minimum to obtain the right output frequency, along with the minimum loss dissipation.

The clock sequence inherently leads to delays in commutations which can conflict with the request from the close loop control. Actually if a commutation is anticipated or delayed during the time when they are not possible, nothing will happen. It may result in a rather chaotic behavior of the close loop control.

In addition, as mentioned above, the clock sequence does not allow for voltage fine tuning. Voltage can only be varied using the excitation.

SUMMARY OF THE INVENTION

An aspect of the present invention is to provide an improved method for controlling a matrix converter.

The proposed "advanced clock" method is a concept to generate requests for commutation which are all possible to do immediately and to the method even allows shaping of the output voltage while keeping the advantage of a low commutation frequency.

The (main) goals are to generate a sequence having one or more attributes:
1. where commutations are immediately done
2. where voltage phase is controlled (component at grid frequency)
3. which allows for voltage amplitude tuning without changing its phase
4. which allows for 'safety angle' management and/or THD (total harmonic distortion) tuning Obtaining a sequence where commutations are immediately done is easy, one just has to delay the request until the commutation is possible. It's indeed impossible to obtain in this way a controlled output voltage phase as needed for a proper close loop control.

Specifically, the present invention proposes an improved method for operating a matrix converter which when being operated to convert n phases of a generator into alternating voltage with $n_r$ ($n_r<n$) phases of a load connected to a network, alternatingly connects the nr phases of the load via a multiple number of controllable bi-directional switches arranged in an (n×$n_r$) matrix, whereby nr phases of the generator are always connected with the load while (n–$n_r$) phases of the generator are not connected with the load.

In contrast to the state of the art, where for controlling the switching of a phase k of the generator to a phase c of the grid a linearly increasing function k(t) is used, the present invention proposes for controlling the switching of a phase k of the generator at a time t to a phase c of the grid, a periodical, continuous, segmented function k(t), which is a broken line, wherein each segment i is defined by a starting time $t_i$ and a pulsation $\omega_i$, and wherein for the control the value of k(t) is rounded to the closest integer value.

One preferred function to this end for k(t) is defined as $$k(t) = 1 + \frac{n}{2\pi}\left(\omega_i(t-t_i) + \theta_{0i} + (c-1)\frac{2\pi}{n_r} + \varphi_g - \varphi_c\right)$$

wherein $\theta_{0i}$ is an offset angle to make k(t) a continuous function, n is number of generator phases, c is the converter phase, $\phi_g$ is the phase shift of the generator voltage and $\phi_c$ is the phase shift of converter voltage.

For most applications in high-power conversion it proves to be sufficient to divide half a grid period into 2-5 segments, preferably into three or four segments. As a matter of fact, it is in the context of the proposed control advantageous to have as many generator phases as possible, so it is advantageous to have more than six, for example 27, 54 or even higher phase order.

Specific advantageous parameterizations of these segments are generally as follows:
  starting point $t_1$ of the first segment is chosen to be the moment when the output current passes the zero crossing, and wherein the first pulsation $\omega_1$, is chosen to be equal or higher than the generator pulsation.
  starting point of the second segment $t_2$ is chosen to be a moment when the generator voltage essentially starts to reach its maximum value, and/or wherein the pulsation $\omega_2$ in the second segment is chosen to be zero or at least positive.
  starting point of the third segment $t_3$ is chosen to be a moment when the generator voltage essentially starts to decrease from the maximum value.

time difference between the start $t_3$ of the third segment and the start $t_2$ of the second segment is in the range of 0.5-5 ms.

According to a further preferred embodiment of the present invention, the matrix converter, when being operated to convert energy from the generator to the load, only allows the switching over from a selected connected phase of the generator to a selected non-connected phase of the generator, such that only natural commutations occur.

The present invention furthermore relates to a matrix converter for implementing the method as given above, comprising a multiple number of controllable bi-directional switches arranged in an (n×n$_r$) matrix; said switches, controlled by a control unit, selectably connecting n inputs with nr outputs, wherein first means for determining the signs of the currents in the inputs, and second means for determining the signs of the voltages between the inputs are provided, and that the first and second means are in active connection with the control system, and wherein the control system is adapted to use the periodical, continuous, segmented function k(t) for firing the switches.

Preferably the switches are connected to the control system via a signal line by way of which information concerning the switch state of the switches is transmitted to the control system.

The present invention also relates to a generator unit comprising at least one matrix converter as given above and at least one generator, which generator comprises a rotor and a stator.

Further embodiments of the present invention are outlined in the dependent claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings preferred embodiments of the invention are shown in which.

DETAILED DESCRIPTION

Figure 1:
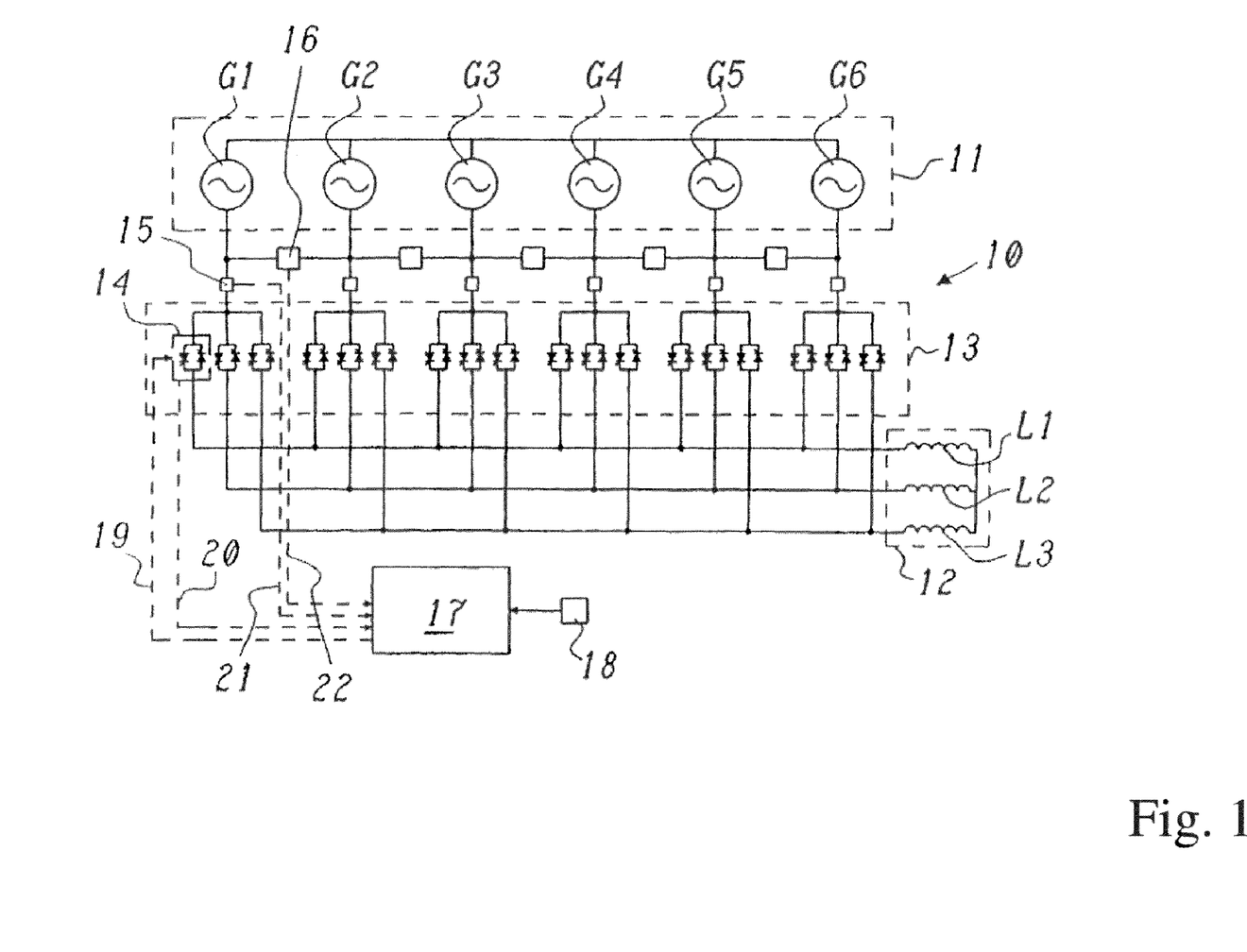
FIG. 1 is a diagrammatic representation of the commutation with a matrix converter comprising 6 input phases and 3 output phases as it can be used for fully natural commutation.

Referring to the drawings, which are for the purpose of illustrating the present preferred embodiments of the invention and not for the purpose of limiting the same, FIG. 1 shows a schematic circuit diagram of a matrix converter comprising 6 input phases and 3 output phases which is designed and controlled to allow natural commutations only. Such a matrix converter has been disclosed in DE-A-100 51 222 as well as in the corresponding European application.

A matrix converter as described in these documents as well as its mode of operation as described therein shall form the basis for the examples given here. The matrix converter 10, when being used to convert the frequency of the voltage generated by the generator 11 to a frequency as requested by the load 12, i.e. the grid to which the generator is connected, in a time sequence connects phases G1, ..., G6 of a generator 11 to the 3 phases L1, ..., L3 of a load 12.

The power component 13 required for it comprises 18 bi-directional switches 14 in the form of antiparallel switched thyristors. The switches 14 are arranged in a (6×3) matrix. A control system 17 is provided for selecting the switches 14, said control receiving time signals from a clock 18 (a clock frequency). The switching state of the switches 14 (ON, OFF) is monitored and in each case reported to the control system 17 via a first signal line 20. In each instance the switches 14 are selected by the control system 17 via a control line 19.

In each of the individual phases G1, ..., G6 of the generator 11, a current measuring device 15 is arranged in each instance which reports the sign of the phase current via a second signal line 21, to the control system 17. In addition, voltage measuring devices 16 are arranged between the phases G1, ..., G6 of the generator 11, said voltage measuring devices reporting the sign of the respective phase difference voltage to the control system 17 via a third signal line 22.

As disclosed in DE-A-100 51 222, a commutation criterion can be derived for commutation within the matrix converter 10, said commutation criterion being essentially based on the sign of the product of the phase difference voltage between the phase to be switched off and the phase to be switched on and of the phase current in the phase to be switched off. If this product is negative, commutation between these two phases is allowed. Otherwise commutation is prohibited. Commutation is triggered by the control system 17, if a commutation is present after a specified time and if the commutation criterion is met. Since for commutation a "free" phase of the generator 11 is required and since in each instance certain switches 14 must not be activated, so as to avoid short circuits, the control system 17 must know at all times which of the phases G1, ..., G6 are free, i.e. in which of the phases G1, ..., G6 all associated switches 14 are open, i.e. not carrying any power. The control system 17 must also know to which of the output phases L1, ..., L3 the phase which is to be commuted is switched, so as to precisely switch on that switch which is suitable for this commutation. The above-mentioned commutation criterion is based on the physical premise that a natural commutation between two phases of the generator 11 can only be carried out successfully if at the point of time of commutation to the absolute value of the current iGx of the phase Gx from which one wants to commutate, is falling, while the absolute value of the current iGy of the phase Gy to which one wants to commutate, is rising. This necessary condition means that the phase to which one wants to commutate, has a higher electromotive force than, and the same sense of direction as, the phase from which one wants to commutate. However, since the electromotive force can only be measured during idling, the criterion is to be established with easily accessible or measurable quantities.

As discussed extensively in DE-A-100 51 222, one can find a commutation criterion to select natural commutations only, which is given by:

$$I_k \cdot (V_k - V_l) \cdot K_{ijkl} > 0 \quad (1)$$

with the constant $K_{ijkl}$ depending on the mutual inductances of the phases of the generator and the inductance of the load. Thus if the constants $K_{ijkl}$ determined by the self-inductances and mutual inductances of the generator and the load are known, by means of the easily measurable quantities phase current $I_k$ and phase difference voltage $V_k$-$V_l$ signs it can be determined at all times whether or not an intended natural commutation between the phases k and l of the generator can be carried out. The condition or rule (1) only depends on the signs of the currents and voltages, not however on their actual values. Thus the information necessary for the commutation condition can be obtained with very simple detectors or measuring devices.

The decision process which in the case of a matrix converter 10 according to FIG. 1 leads to selection of the switches 14, is very simple:

First the clock 18 tells the control system 17 at what point in time according to the desired frequency and if applicable according to any feedback information, a new commutation is to take place, i.e. at what point in time the phases presently connected to the load 12 are to be replaced by other phases.

As a result of continuous monitoring of the switches 14 and the phases G1, . . . , G6, the control system 17 knows which phases are free, i.e. do not carry any current, and which phases can subsequently be safely commutated. If one or two commutations are possible, the associated switches 14 are triggered. As has already been mentioned above, simultaneous commutation of three phases is avoided. Any second and third commutations (possible per se) are postponed until they can be carried out safely.

In order to determine a method for controlling the matrix converter, first of all the frequency of commutation has to be evaluated. The principles of how this can be done under standard conditions shall be outlined as follows:

To start with, some relationships shall be defined:

$$\delta t = \frac{1}{nf_c} = \frac{1}{Nf_0}$$

$$N = n\frac{f_c}{f_0}$$

At time t, phase k of generator is connected to phase c of converter. We can then write the equality of voltages:

$$V_g(t) = E\cos\left(\omega t - (k-1)\frac{2\pi}{n} + \varphi_g\right) = E\cos\left(\omega_r t - (c-1)\frac{2\pi}{n_r} + \varphi_c\right)$$

$\phi_g$ and $\phi_c$ being respectively the phase shifts of generator and converter voltages.

This equation has two solutions:

$$\omega t - (k-1)\frac{2\pi}{n} + \varphi_g = \pm\left(\omega_r t - (c-1)\frac{2\pi}{n_r} + \varphi_c\right)$$

that is to say:

$$(\omega - \omega_r)t = (k_1 - 1)\frac{2\pi}{n} - (c-1)\frac{2\pi}{n_r} - \varphi_g + \varphi_c$$

$$(\omega + \omega_r)t = (k_2 - 1)\frac{2\pi}{n} + (c-1)\frac{2\pi}{n_r} - \varphi_g - \varphi_c$$

We notice that there are two possible frequencies of commutation. We keep the first solution, because it corresponds to the lower frequency of commutation, and consequently to the smaller number of commutations.

In order to avoid negative frequency, we use:

$$f_c = |f - f_r| = S_c \cdot (f - f_r)$$

The instants of commutations for controlling the converter can now be found as follows:

If the converter voltage $V_c$ is in phase with generator voltage $V_g$, the relationship between time t and generator phase k to be connected to network phase c is:

$$S_c f_c t = \frac{1}{2\pi}\left[(k-1)\frac{2\pi}{n} - (c-1)\frac{2\pi}{n_r}\right]$$

Introducing the interval of regular commutations $\delta t$:

$$S_c \frac{t}{\delta t} = k - 1 - (c-1)\frac{n}{n_r}$$

The commutations occur then at instants $t_k$:

$$t_k = \left(k - \frac{1}{2} + \varepsilon_k + k_0\right)\delta t$$

with (k−½). $\delta t$: regular repartition
  $\varepsilon k$ : shifting of commutation k, in p.u. of $\delta t$
  k0: global shifting of network phase, in p.u. of $\delta t$ (0 for phase 1)

$$k_0(c) = -S_c(c-1)\frac{n}{n_r}$$

When the generator frequency f is greater than network frequency $f_r$, each network phase commutes successively on generator phases in increasing order.

Generator phase $G_k$ is connected to one network phase during the time interval $[t_{k-1}; t_k]$. The converter output voltage is given by:

$$V_c(t) = E \cdot \cos\left[\omega t - (k-1)\frac{2\pi}{n}\right]$$

This is the clock target curve.

On the contrary, in case of increasing the frequency, the order of commutations must be inverted: we commute from phase k to phase (k−1) instead of (k+1). During the time interval $[t_{k-1}; t_k]$, the phase $G_{k'}$ will be connected instead of phase $G_k$, with k'=(2−k) modulo n.

The converter output voltage becomes:

$$V_c(t) = E \cdot \cos\left[\omega t - (2-k-1)\frac{2\pi}{n}\right] = E \cdot \cos\left[\omega t + (k-1)\frac{2\pi}{n}\right]$$

We can combine both cases, by introducing the sign of commutation frequency into the formula:

$$V_c(t) = E \cdot \cos\left[\omega t - S_c(k-1)\frac{2\pi}{n}\right]$$

Note: in both cases, phase $G_1$ is connected to $N_1$ during time interval $[-\delta t/2; \delta t/2]$ if commutations are regular.

According to the present invention, this target curve is now adapted for obtaining the advanced clock sequence.

As given above, the clock target curve is defined by:

$$V_c(t) = E \cdot \cos\left[\omega t - (k-1)\frac{2\pi}{n}\right]$$

in which k holds for the index of the phase which should be connected at time t to the grid phase c. Departing from the above relationship $$(\omega - \omega_r)t = (k_1 - 1)\frac{2\pi}{n} - (c-1)\frac{2\pi}{n_r} - \varphi_g + \varphi_c$$

the current value of k can easily be calculated to be:

$$k(t) = 1 + \frac{n}{2\pi}\left((\omega - \omega_r)t + (c-1)\frac{2\pi}{n_r} + \varphi_g - \varphi_c\right)$$

The phase number thus increases linearly over time (straight line). It's rounded to the closest integer value.

The target curve for the advanced clock sequence is now set up as follows:

The advanced clock sequence has a phase versus time function k(t) which is no longer a straight line but a broken line made of a succession of segments. Each segment is defined by a starting time $t_i$ and a pulsation $\omega_i$. The function k(t) is continuous.

The pulsation being constant over the duration of a segment, the output voltage is an arch of a cosine wave. The output voltage is also a continuous function.

As a consequence of k(t) being a continuous function there is no zero-crossing jumps like in a "cyclo" sequence.

The resulting number of commutations is as low as with the basic clock. Therefore the commutation losses are low and the voltage output is not be lowered by the averaging effect of the high frequency part of the "cyclo" sequence.

The benefit of defining the sequence by a handful of straight segments is to be able to predict harmonic distortion with simple formulas, i.e. with pre-calculated Fourier transforms. More elegant waveforms are possible.

The sequence is periodical. It has to be defined over half of a grid period. Therefore the advanced clock management is done with a reduced time:

$$t_{red} = (t - t_1) + \frac{\pi}{\omega}\text{int}\left[(t - t_1)\frac{\omega}{\pi}\right]$$

How many segments are necessary?
With 2 segments per half grid-period: it is possible to generate a sequence where commutations are immediately done while the phase of the converter output voltage is controlled.
With 3 segments per half grid-period: it is in addition possible to tune the voltage amplitude.
With 4 segments per half grid-period: the fourth segment can be used to shape further the voltage, for instance to prevent commutation which would occur too close to the zero-crossing of current.

The advanced clock is in the following defined by a set of 4 segments over half a grid period. Additional segments can be added whenever necessary and appropriate.

The phase number k(t) for the advanced clock is:

$$k(t) = 1 + \frac{n}{2\pi}\left(\omega_i(t - t_i) + \theta_{0i} + (c-1)\frac{2\pi}{n_r} + \varphi_g - \varphi_c\right)$$

$\theta_{0i}$ is the required offset angle to make k(t) a continuous function.

Figure 2:
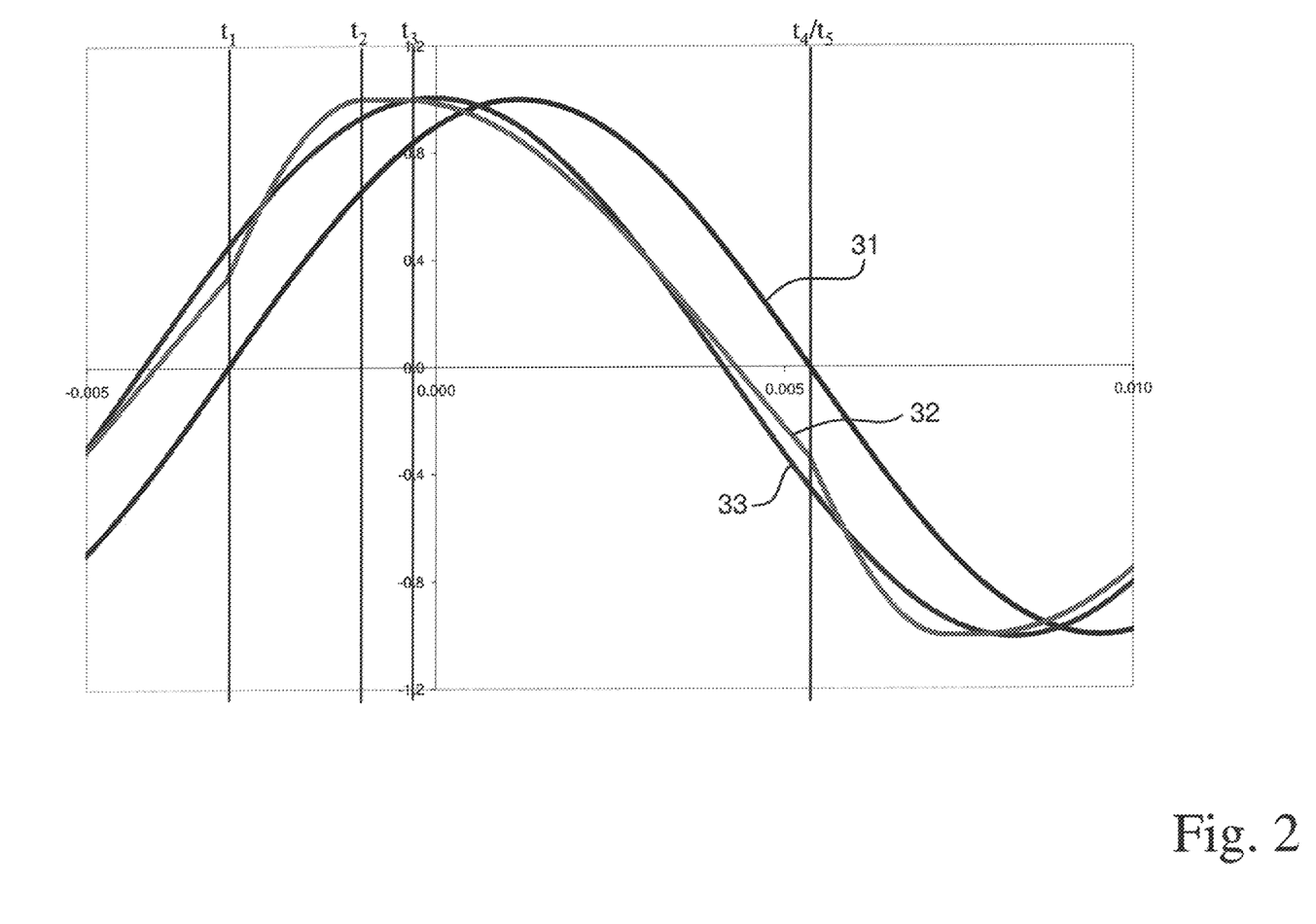
FIG. 2 shows the current waveform of the output and the output voltage waveform with the advanced clock as a function of time as well as the values of segment times.

FIG. 2 shows the corresponding results, i.e. the resulting output voltage waveform with the advanced clock 32 in relation to the current waveform 31 as well as to the generator voltage waveform 33, wherein in this example $t_4 = t_5$.

The plot of FIG. 2 shows the waveform of voltage, assuming a very large number of generator phases. The time parameters are also shown. The parameters of the curve are defined as follows:

$t_1$ is the time of zero crossing of the output current. From $t_1$ to $t_2$ the pulsation is $\omega_1$. During this period of time the commutations to the next phase are impossible, therefore $\omega_i$ should be equal to the generator pulsation $\omega$ or higher.

$t_2$ is the first time, after $t_1$, when the generator voltage reaches its maximum value. Afterward normal commutation (i->i+1) can again be done. From $t_2$ to $t_3$ the pulsation is $\omega_i$. During this period voltage is expected to be close to the peak value of the generator voltage. The voltage is maximum when $\omega_2$ is equal to zero. When $\omega_2$ is not set to zero, for THD improvement reasons, it should preferably be at least positive.

$t_3$ is a the ending time of the segment with high voltage. The duration of the segment $t_p = t_3 - t_2$ has a significant impact on the root mean square value of the voltage. From $t_3$ to t4 the pulsation is $\omega_3$.

$t_4$ is a free parameter. After $t_4$ the pulsation is $\omega_4$. One possible use of this segment is to prevent commutations before the zero crossing of the current. In this case $\omega_4 = \omega_1$.

$t_5 = t_1 + \pi/\omega$ is the ending time of the considered half grid-period. It is equal to the next value of $t_1$.

Parameterization, harmonics functions:

The advanced clock sequence is defined by eight parameters in case of four segments, four characteristic times and four pulsations. Generally it is defined by twice as many parameters as there is segments. Some are fixed by operating conditions while others are free, within limits.

The pulsations can be defined for instance by:
$\omega_2 = 0$ in order to maximize voltage utilization.
$\omega_4 = \omega_1 = \omega$ in order to avoid commutation request from $t_1$ to $t_2$ and from $t_4$ to $t_5$.
$\omega_3$ results from the equation $\omega_1(t_2 - t_1) + \omega_3(t_4 - t_3) + \omega_4(t_4 - t_4) = \pi$ (to obtain the right frequency), or generally $$\pi = \sum_1^n \omega_n(t_{n+1} - t_n)$$

Regarding the characteristic times
$t_1$: time of zero-crossing of the current coming from monitoring/settings
$t_2$: is obtained by solving the equation $S_1 = 0$
$t_3$ and $t_4$ are free parameters which however one chosen of course determine the value of $t_2$.

For the case of the above parameterization with $t_4 = t_5$ for example the harmonic functions are given by:

$$C_l = \frac{\omega_0}{\pi} \begin{bmatrix} \sin(l\omega_0 t_2)\left(\frac{1}{\omega_1 + l\omega_0} - \frac{1}{\omega_1 - l\omega_0} - \frac{2}{l\omega_0}\right) - \sin(l\omega_0 t_3)\left(\frac{1}{\omega_3 + l\omega_0} - \frac{1}{\omega_3 - l\omega_0} - \frac{2}{l\omega_0}\right) \\ -\sin(\omega_3(t_4 - t_3))\cos(l\omega_0 t_4)\left(\frac{1}{\omega_1 + l\omega_0} + \frac{1}{\omega_1 - l\omega_0} - \frac{1}{\omega_3 + l\omega_0} - \frac{1}{\omega_3 - l\omega_0}\right) \\ -\cos(\omega_3(t_4 - t_3))\sin(l\omega_0 t_4)\left(\frac{1}{\omega_1 + l\omega_0} - \frac{1}{\omega_1 - l\omega_0} - \frac{1}{\omega_3 + l\omega_0} + \frac{1}{\omega_3 - l\omega_0}\right) \end{bmatrix}$$

$$S_l = \frac{\omega_0}{\pi} \begin{bmatrix} \cos(l\omega_0 t_2)\left(\frac{1}{\omega_1 + l\omega_0} - \frac{1}{\omega_1 - l\omega_0} - \frac{2}{l\omega_0}\right) - \cos(l\omega_0 t_3)\left(\frac{1}{\omega_3 + l\omega_0} - \frac{1}{\omega_3 - l\omega_0} - \frac{2}{l\omega_0}\right) \\ -\cos(\omega_3(t_4 - t_3))\cos(l\omega_0 t_4)\left(\frac{1}{\omega_1 + l\omega_0} - \frac{1}{\omega_1 - l\omega_0} - \frac{1}{\omega_3 + l\omega_0} + \frac{1}{\omega_3 - l\omega_0}\right) \\ -\sin(\omega_3(t_4 - t_3))\sin(l\omega_0 t_4)\left(\frac{1}{\omega_1 + l\omega_0} + \frac{1}{\omega_1 - l\omega_0} - \frac{1}{\omega_3 + l\omega_0} - \frac{1}{\omega_3 - l\omega_0}\right) \end{bmatrix}$$

The proposed method allows for a voltage tuning capability. The most important parameter is the duration, $t_p = t_3 - t_2$, of the segment from $t_2$ to $t_3$ with pulsation $\omega_2$.

Figure 3:
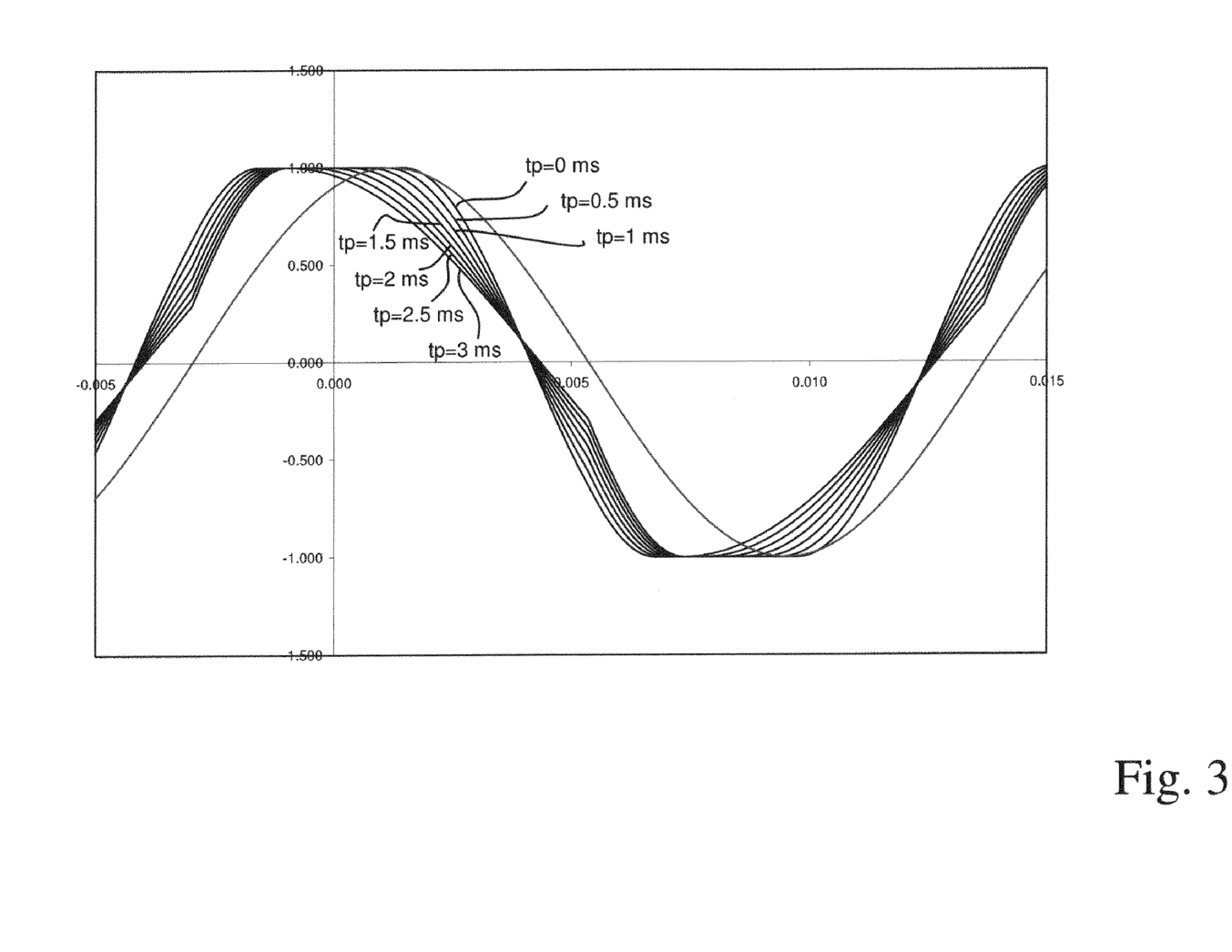
FIG. 3 shows the current waveform of the output and the output voltage waveform with the advanced clock as a function of time for different values of $t_p$.

In FIG. 3, showing the tuning possibilities, the parameter $t_p$ as been varied from 0 ms to 3 ms in small steps.

Figure 4:
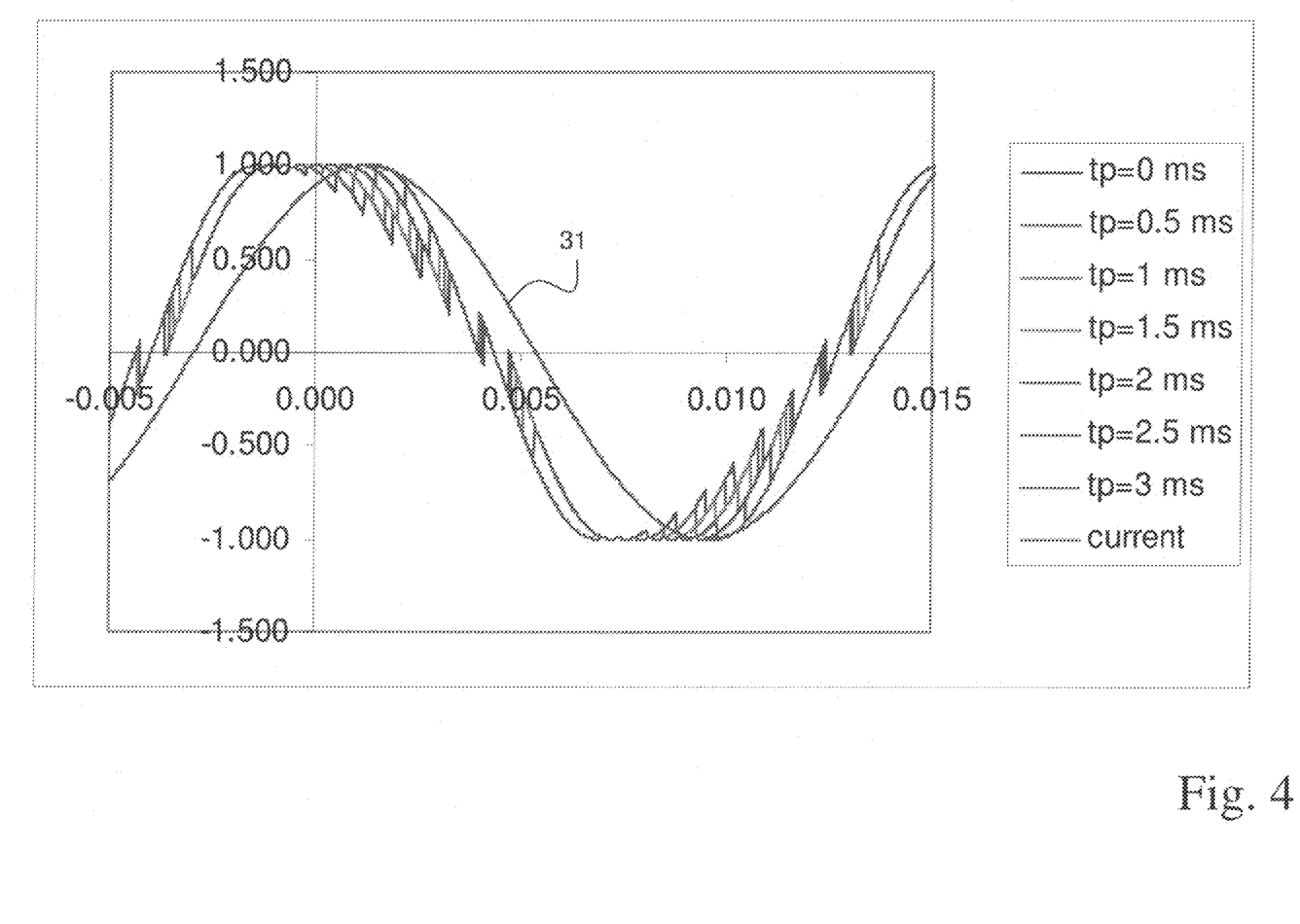
FIG. 4 shows the same as FIG. 3 but with a 27 phase configuration.

FIG. 4 essentially shows the same as FIG. 2 with 27 phase configuration.

With the waveforms of FIG. 4 the output voltage is, most of the time, larger than the generator voltage. The following table 1 shows the amplification factors for the curves of FIG. 4.

TABLE 1

| $t_p$ in millisecond | $V_c/V_g$ |
| --- | --- |
| 0 | 98% |
| 0.5 | 101% |
| 1 | 103% |
| 1.5 | 106% |
| 2 | 111% |
| 2.5 | 113% |
| 3 | 114% |

What is claimed is:

1. A method for operating a matrix converter to convert n phases of a generator into alternating voltage with $n_r$ ($n_r < n$) phases of a load connected to a network, the method comprising:

alternatingly connecting the nr phases of the load using a plurality of controllable bi-directional switches disposed in an ($n \times n_r$) matrix, wherein nr phases of the generator are always connected with the load and ($n - n_r$) phases of the generator are not connected with the load;

controlling the switching of a phase k of the generator at a time t to a phase c of the grid, using a periodical, continuous, segmented function k(t) defining a broken line having a plurality of segments, wherein each segment i is defined by a starting time $t_i$ and a pulsation $\omega_i$; and rounding the value of the function k(t) to the closest integer value.

2. The method as recited in claim 1, wherein the function k(t) is defined as $$k(t) = 1 + \frac{n}{2\pi}\left(\omega_i(t - t_i) + \theta_{0i} + (c-1)\frac{2\pi}{n_r} + \varphi_g - \varphi_c\right)$$

wherein $\theta_{0i}$ is an offset angle to make k(t) a continuous function, n is number of generator phases, c is the converter phase, $\phi_g$ is the phase shift of the generator voltage and $\phi_c$ is the phase shift of converter voltage.

3. The method as recited in claim 1, wherein over half of a grid period two or three segments are used.

4. The method as recited in claim 1, wherein over half of the grid period four segments are used.

5. The method as recited in claim 1, wherein the starting point $t_1$ of the first segment is a time when the output current passes a zero crossing, and wherein the first pulsation $\omega_1$ is greater than or equal to a generator pulsation.

6. The method as recited in claim 1, wherein the starting point of the second segment $t_2$ is a moment when the generator voltage essentially starts to reach its maximum value, and/or wherein a pulsation $\omega_2$ of the second segment is greater than or equal to zero.

7. The method as recited in claim 1, wherein the starting point of the third segment $t_3$ is a time when the generator voltage essentially starts to decrease from the maximum value.

8. The method as recited in claim 1, wherein a time difference between the start $t_3$ of the third segment and the start $t_2$ of the second segment is in the range of 0.5-5 ms.

9. The method as recited in claim 1, wherein the matrix converter, when operated to convert energy from the generator to the load, only allows the switching over from a selected connected phase of the generator to a selected non-connected phase of the generator such that only natural commutations occur.

10. A matrix converter for converting n phases of a generator into alternating voltage with $n_r$ ($n_r < n$) phases of a load connected to a network comprising:

a plurality of controllable bi-directional switches arranged in an ($n \times n_r$) matrix having n inputs with $n_r$ outputs;

a control unit controlling the plurality of switches so as to selectably connect n inputs of the generator with nr outputs;

a current measuring device for determining signs of currents in the inputs; and a voltage measuring device for determining signs of the voltages between the inputs, wherein the current measuring device and the voltage measuring device are in active connection with the control unit, and wherein the control unit is configured to control the switches of a phase k of the generator at a time t based upon a periodical, continuous, segmented function k(t).

11. The matrix converter as recited in claim 10, further comprising a signal line connecting the switches connected to the control system, the signal line transmitting information concerning the switch state of the switches to the control system.

12. The matrix converter as recited in claim 10, wherein the bi-directional switches include antiparallel-switched thyristors.

13. A generator unit comprising:
- a rotor;
- a stator; and
- a matrix converter for converting n phases of the generator into alternating voltage with $n_r$ ($n_r<n$) phases of a load connected to a network, wherein the matrix converter includes:
- a plurality of controllable bi-directional switches arranged in an ($n \times n_r$) matrix having n inputs with nr outputs;
- a control unit controlling the plurality of switches so as to selectably connect n inputs of the generator with nr outputs;
- a current measuring device for determining signs of currents in the inputs; and
- a voltage measuring device for determining signs of the voltages between the inputs, wherein the current measuring device and the voltage measuring device are in active connection with the control unit, and wherein the control unit is configured to control the switches of a phase k of the generator at a time t based upon a periodical, continuous, segmented function k(t).

* * * * *